US012131367B2

(12) United States Patent
Engel et al.

(10) Patent No.: US 12,131,367 B2
(45) Date of Patent: Oct. 29, 2024

(54) INTELLIGENT PRODUCT MATCHING BASED ON A NATURAL LANGUAGE QUERY

(71) Applicant: WESCO Distribution, Inc., Pittsburgh, PA (US)

(72) Inventors: John J. Engel, Pittsburgh, PA (US); Shashi Bhushan Dande, Spring, TX (US); Kishor Saitwal, Sugar Land, TX (US); Raja Vikram Raj Pandya, Katy, TX (US); Avinash Wesley, New Caney, TX (US); Kris Lindsay, Mount Crawford, VA (US); Benjamin James Albu, Pittsburgh, PA (US); Akash Khurana, Houston, TX (US); Ashok Ramesh Bajaj, Katy, TX (US); Merwan Mereby, Baton Rouge, LA (US)

(73) Assignee: WESCO Distribution, Inc., Pittsburgh, PA (US)

( * ) Notice: Subject to any disclaimer, the term of this patent is extended or adjusted under 35 U.S.C. 154(b) by 0 days.

(21) Appl. No.: 18/195,644

(22) Filed: May 10, 2023

(65) Prior Publication Data
US 2024/0127312 A1 Apr. 18, 2024

Related U.S. Application Data

(63) Continuation of application No. 17/968,524, filed on Oct. 18, 2022, which is a continuation of application (Continued)

(51) Int. Cl.
G06Q 30/0601 (2023.01)
G06Q 10/087 (2023.01)
G06Q 30/0234 (2023.01)

(52) U.S. Cl.
CPC ....... *G06Q 30/0631* (2013.01); *G06Q 10/087* (2013.01); *G06Q 30/0234* (2013.01)

(58) Field of Classification Search
CPC ............ G06Q 30/0631; G06Q 10/087; G06Q 30/0234
See application file for complete search history.

(56) References Cited

U.S. PATENT DOCUMENTS 10,515,625 B1 * 12/2019 Metallinou ......... G10L 15/1822
11,520,815 B1 * 12/2022 Gutta ................... G06F 40/186
(Continued)

Primary Examiner — A. Hunter Wilder
Assistant Examiner — Joseph M Mutschler
(74) Attorney, Agent, or Firm — K&L Gates LLP

(57) ABSTRACT

A computer method for identifying product in a distributor's inventory system that fulfills a product request made via a natural language query. the natural language query is received as a product request including multiple words in sequential order. The words are vectorized into word-vectors that are concatenated and used to generate a query embedding. The query embedding is processed utilizing a trained product category classifier that predicts which product category the requested product belongs. Forward and backward sequence vectors are generated from the sequentially ordered words of the query that are concatenated and processed using a trained model specific to the predicted product category. The sequence vectors represent positional relationships between the words of the natural language query. Thereafter, the system identifies product attribute(s) embodied in the natural language query that each correspond to a predetermined key-characteristic of the category.

17 Claims, 6 Drawing Sheets

Related U.S. Application Data

No. 17/968,006, filed on Oct. 18, 2022, application No. 18/195,644 is a continuation of application No. 17/968,564, filed on Oct. 18, 2022, which is a continuation of application No. 17/968,039, filed on Oct. 18, 2022, application No. 18/195,644 is a continuation of application No. 17/968,492, filed on Oct. 18, 2022.

(56) References Cited

U.S. PATENT DOCUMENTS

| | | | | |
|---|---|---|---|---|
| 2003/0097309 | A1* | 5/2003 | Gibler | G06Q 30/0635 705/26.81 |
| 2007/0244842 | A1* | 10/2007 | Ishii | G06T 7/12 706/18 |
| 2017/0060868 | A1* | 3/2017 | Rais Ghasem | G06F 16/243 |
| 2018/0089242 | A1* | 3/2018 | Lev | G06F 16/2228 |
| 2019/0156156 | A1* | 5/2019 | Tang | G06V 10/82 |
| 2019/0213277 | A1* | 7/2019 | DeLuca | G06Q 30/0627 |
| 2020/0134019 | A1* | 4/2020 | Podgorny | G06N 3/044 |
| 2021/0081503 | A1* | 3/2021 | Tran | G06N 3/08 |
| 2021/0342552 | A1* | 11/2021 | Mishra | G06F 40/30 |
| 2022/0139386 | A1* | 5/2022 | Li | G06F 40/126 704/9 |
| 2022/0237386 | A1* | 7/2022 | Cheng | G06F 40/205 |
| 2022/0414737 | A1* | 12/2022 | Wang | G06Q 30/0627 |
| 2023/0186319 | A1* | 6/2023 | Nguyen | G06F 40/295 704/9 |

* cited by examiner

| LED lamp | 15 W | power | 120V | voltage |
| --- | --- | --- | --- | --- |
| LED Bulbs | Wattage | N/A | Voltage Rating | N/A |

FIG. 4

INTELLIGENT PRODUCT MATCHING BASED ON A NATURAL LANGUAGE QUERY

CROSS REFERENCE TO RELATED APPLICATIONS

The present application is: (1) a continuation application of, and claims priority to U.S. application Ser. No. 17/968,524 filed Oct. 18, 2022, which is a continuation application of, and claims priority to U.S. application Ser. No. 17/968,006 filed Oct. 18, 2022; (2) a continuation application of, and claims priority to U.S. application Ser. No. 17/968,564 filed Oct. 18, 2022 which is a continuation application of, and claims priority to U.S. application Ser. No. 17/968,039 filed Oct. 18, 2022; and (3) a continuation application of, and claims priority to U.S. application Ser. No. 17/968,492 filed Oct. 18, 2022; said applications are each expressly incorporated herein by reference in their entireties, without disclaimer.

BACKGROUND

The present technology relates to systems, methods and software that facilitate item searching within the domain of a product distributor. The illustrative example of an electrical parts distributor is utilized in this disclosure. It should be appreciated that an aim of this new technology is to provide fast, accurate identification of requested product(s) regardless of the sophistication of the searcher regarding the specific type of parts domain. While all users are facilitated by this technology, those persons expected to be the primary users are customers and internal sales representatives of the specific parts-type distributor. It should be appreciated that regardless of the specific type of products with which the system is associated, in all instances the user's input to the system is a natural language query (free-form text) descriptive of (or an attempted naming of) the product being requested.

There are existing systems for identifying sought-after products which also start with receipt of a user-input product request in the form of a typed-in, free-form product description. From there, the distributor's search engine takes over and ultimately outputs a list of one or more likely-to-match products, typically using Fuzzy Match algorithms that identify probable/possible matching product candidates. Examples of such algorithms include Partial Ratio, Levenshtein Distance, Damerau-Levenshtein Distance, Jarro Distance, Jarro-Winkler Distance, and Jaccard Similarity. In these systems, it is also not uncommon for the Fuzzy Match algorithm to provide an associated match-score for each of its predicted matching product candidates that is indicative of the system's confidence in its respective predictions.

It is appreciated, however, that there are some inherent deficiencies in simply using Fuzzy Match algorithms to identify requested product. Among other things, Fuzzy Match algorithms can be prone to relatively high incidents of false positive and false negative product identifications; that is, the algorithms have a propensity to incorrectly classify non-matches as matches, and vice versa. Another less-than-ideal characteristic of these Fuzzy Match algorithms is that during the matching process, the search query is typically compared to (processed against) every comparable record in the system, which can be unacceptably time and resource consuming. Here, the primary detrimental effect is that the associated product identification processes require exceedingly expensive, high-capacity computing systems capable of handling such resource-intensive comparison computations. For these reasons, among others, the present technology has been developed to provide more elegant data processing for transforming a user-input, free-form natural language query for a desired product into a high-accuracy prediction of the product in the distributor's inventory that the user is seeking.

BRIEF DESCRIPTION OF THE DRAWINGS

FIG. 4 illustrates a predicted product category (LED Bulbs) and product attributes/characteristics (Wattage and Voltage Rating) and their values (15 W and 120V) that together constitute value-pairs identified by category-specific CRF, all derived from the user-input natural language query;

DETAILED DESCRIPTION

Figure 1:
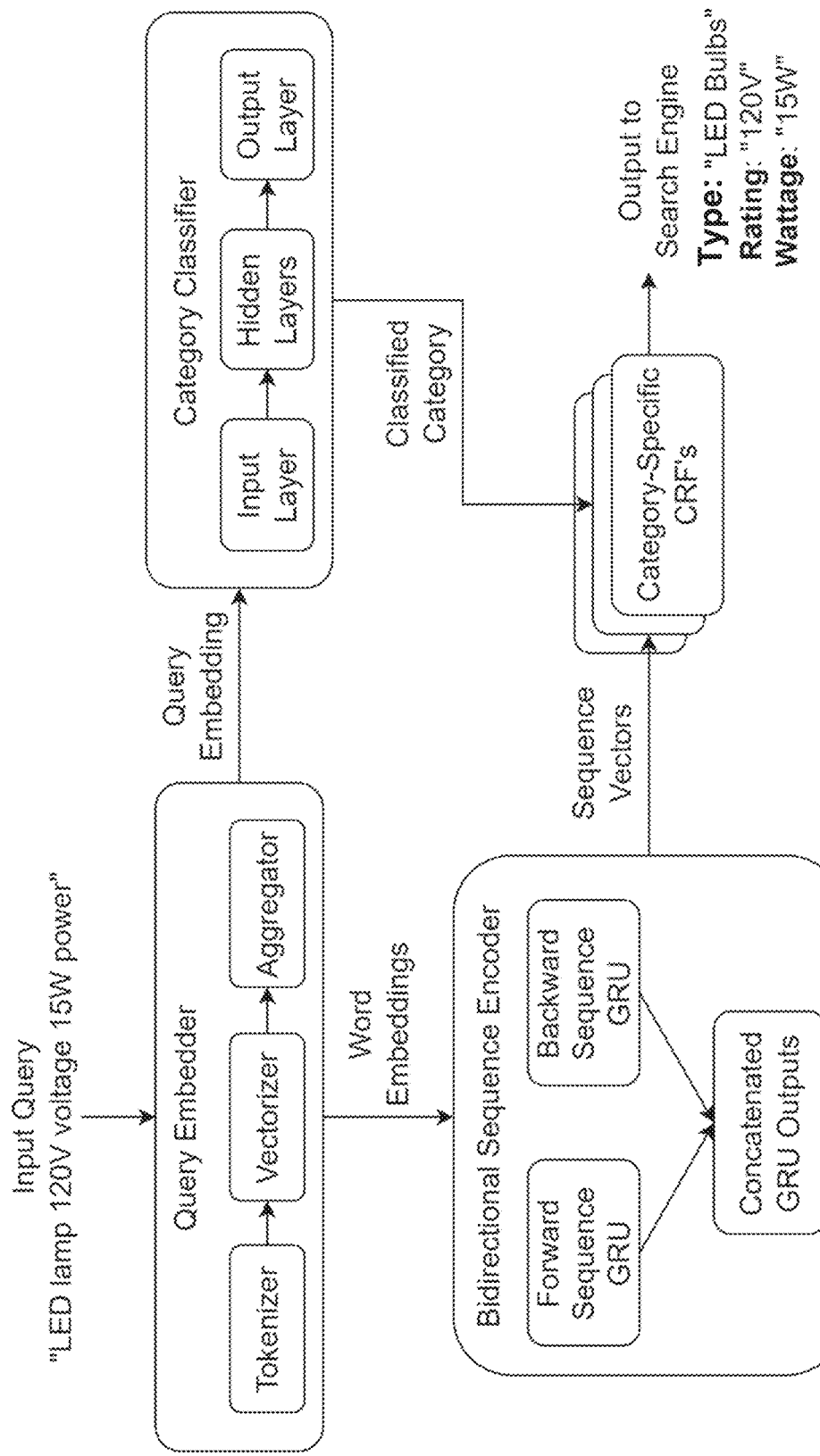
FIG. 1 depicts the complete machine learning pipeline of the presently disclosed product category classification and corresponding attributes identification system.

Within the realm of product distribution, the presently disclosed technology provides a product classification and attribute identification system that predicts a desired product's category membership within the system and identifies key product attributes of the desired product indicated by a natural language product query from a system user. From the natural language query, a refined query is generated and provided to a downstream search engine that can then, because of the refinement, rapidly and efficiently identify matching product in the distributor's inventory. In the example of this disclosure, the technology employs a trained machine learning model to predict a queried electrical hardware product's category membership and then uses a different trained machine learning model specific to the predicted product category to identify key-attribute(s) of the sought-after product. The results of this analysis are input into a downstream catalog search engine for rapid identification of the likely-desired product. This solution is primarily (but not exclusively) intended to be used by a distributor's customers and internal sales representatives to quickly and accurately search for items in the distributor's inventory based on a freeform, natural language product description (query) input by the requesting entity (person).

The following is an example of a natural language query describing a user's desired product: "LED lamp 120V voltage 15 W power." As an initial step, the system processes the query utilizing an algorithm of a trained machine learning model that predicts the category of the system to which the requested product belongs. Next, the system processes the query utilizing an algorithm of a trained machine learning model specific to the predicted category that identifies one or more product attributes (each comprising a key-characteristic, and optionally a value of that key-characteristic, in which case it is referred to as a key-value pair). Thereafter, a query rationalized for the specific inventory system is produced that optimally includes the predicted product category, together with identified key-value pairs. As an example, the following is a rationalized product query derived from the natural language query above: "Category: LED Bulbs, Voltage Rating: 120V, Wattage:15 W." In this example, the key-value pairs are (i) Voltage Rating; and (ii) Wattage together with their respective values of (i) 120V and (ii) 15 W. The predicted Category of the requested product is LED Bulbs. In at least one embodiment, the product categories are set by the distributor and the products in the distributor's inventory are assigned amongst those categories.

The presently disclosed category classification and attribute identification system, among other benefits, enables improved search relevance through custom-training a word embedding model based on electrical hardware vocabulary. In another aspect, effective estimation of query embedding vectors through the simple aggregation of word embeddings is enabled. Improved training and inference efficiency is facilitated through the use of Gated Recurrent Units (GRU), as opposed to Long Short Term Memory (LSTM) units, without compromising product identification accuracy. Bidirectional sequence embeddings coupled with category-specific Conditional Random Field (CRF) models are employed for novel per-category attribute/characteristic and key-value pair identification. In yet a further aspect, category-specific attribute/characteristic identification is enabled through an ensemble of CRF models, each trained individually for a specific product category.

Turning now to details of the instant technology, FIG. 1 shows a machine learning pipeline (flowchart) of the product category classification and attribute/characteristic identification system. The method represented therein depicts a prediction of product category and identification of key-value pairs of product attributes/characteristics based on a user's natural language query. The processed output from the natural language query takes the form of a product category to which the requested product is predicted to belong, together with corresponding category key-characteristics and their values. This distillation or normalization of the user's natural language query enables faster downstream searching for the specific desired product, or sufficiently similar products available in the distribution company's products database.

Functional components of the machine learning process depicted in the flowchart of FIG. 1 includes the following:

Domain-specific word embedding model: The overall represented pipeline of FIG. 1 takes the form of a custom domain-specific word2vec embedding model representing vocabulary pertaining to electrical hardware products and used to train the model. In the present example, the training vocabulary consists of more than 100,000 unique words derived from item catalog data, including item descriptions and attributes. In this regard, the word2vec model comprises a training algorithm of the Continuous Bag Of Words (CBOW) type, with negative sampling and an embedding dimension of 120, and which is used to encode the input queries into numerical form.

Query embedder: An initial process in the depicted pipeline is preprocessing of the natural language query which translates each constituent word (token) in the query to its corresponding word vector. All word vectors are then aggregated to generate a query embedding for future processing. Primary steps in the query embedder include a tokenizer, vectorizer and aggregator as further described below.

Tokenizer: At this stage, the natural language query is processed in accordance with the following steps: (i) standard domain-specific abbreviations are expanded based on an acronyms list provided by the domain administrators; (ii) the words of the query are converted to all lowercase letters and punctuation is removed; and (iii) the query is tokenized into its constituent words.

Vectorizer: Each token from the tokenizer is converted to its vector representation based on the trained word embedding model as otherwise described herein.

Aggregator: The word vector aggregator averages overall word embeddings and outputs a single query embedding with the embedding dimension of 120. This works well as the CBOW algorithm performs word embedding by considering each word's context. At the same time, negative sampling is utilized because each token, while training, only modifies a small percentage of weights, rather than all of them.

Figure 2:
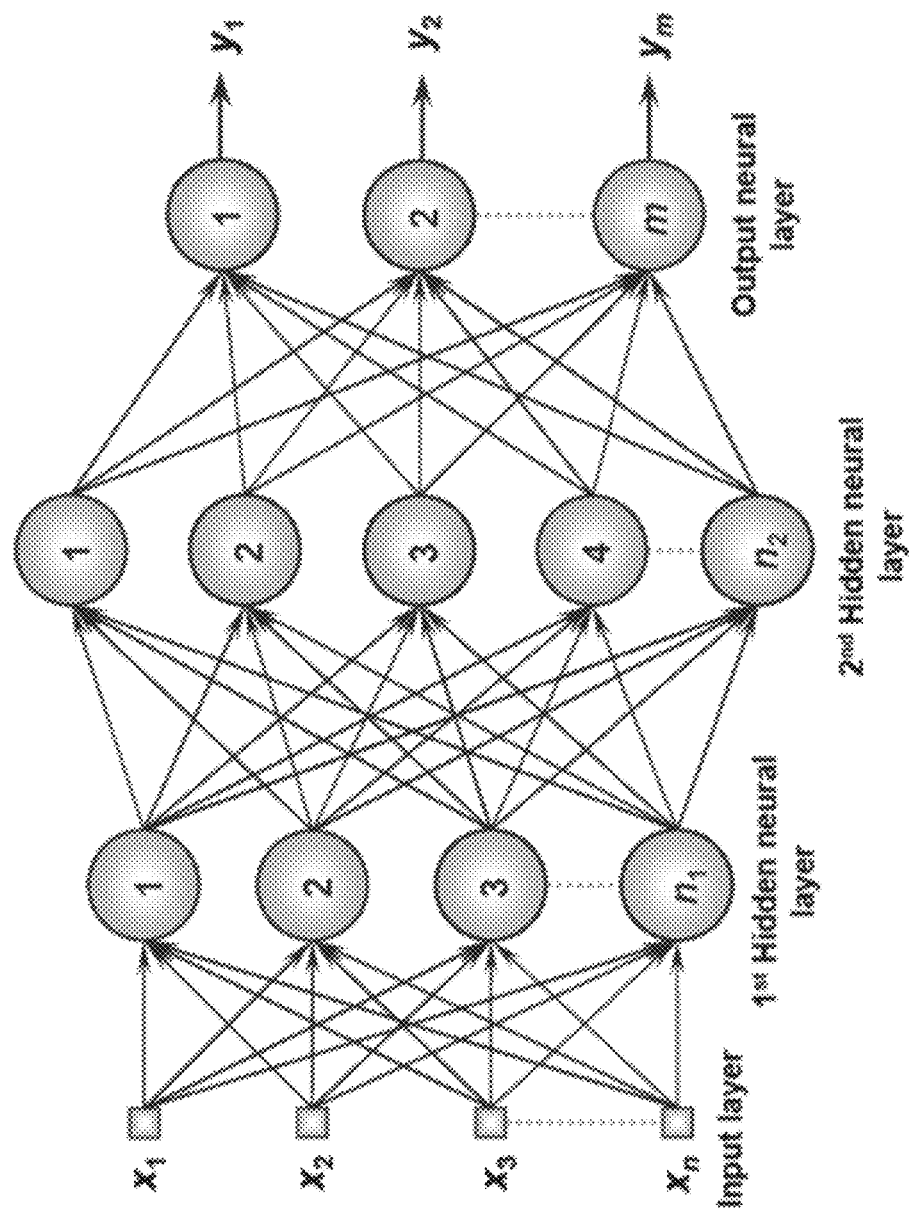
FIG. 2 shows a simplified illustration of a feed-forward MLP architecture with an input layer (n=100), two hidden layers $n_1$=500 and $n_2$=200), and an output layer (m=~100)

The next primary workflow in the pipeline of FIG. 1 comprises the Product Category Classifier. At this stage, the query embedding is classified (predicted to belong) into a product category that is one of the hundreds (instead of millions) of such categories available within the item catalog database (inventory). In particular, 3-layer feed-forward Multi-Layer Perceptron (MLP) architecture intakes the query embedding as referred to above, and returns the predicted product category. In this regard, FIG. 2 provides a simple depiction of this feed-forward MLP architecture with an input layer (n=100), two hidden layers $n_1$=500 and $n_2$=200), and an output layer (m=~100). The hidden layer neurons have a ReLU activation function and softmax is applied to output neurons.

Figure 3:
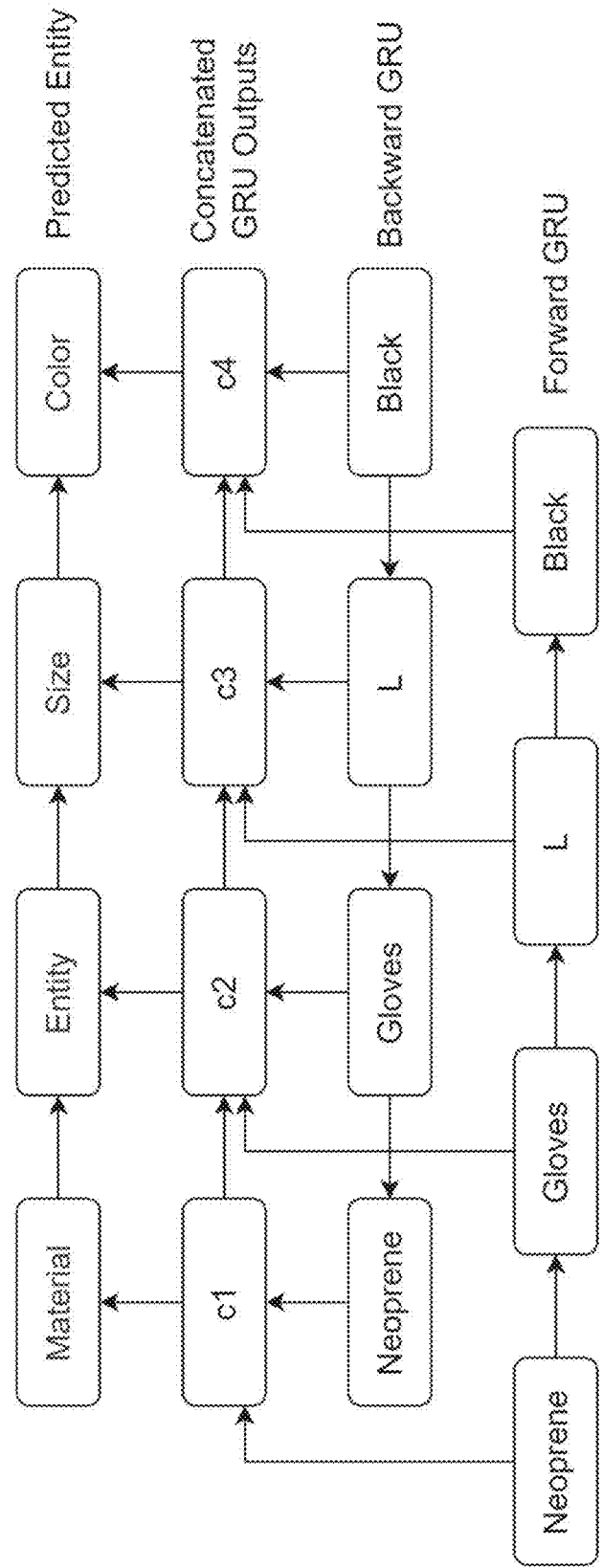
FIG. 3 exemplifies architecture of the presently-employed bidirectional sequence encoder, followed by category-specific CRF, showing one example for identifying key-value pairs of product attributes.

Another primary workflow in the pipeline of FIG. 1 comprises the Bidirectional Sequence Encoder. This stage takes as input the individual word vectors of the constituent query words in their sequential order and outputs a vector representation of the sequence. These sequence vectors are consumed by category-specific CRF that identifies attributes comprising key-characteristics and their values (value pairs). To achieve this, a bidirectional GRU architecture is employed as shown in FIG. 3. This architecture consists of two separate GRU networks, one for reading the forward sequence of individual word embeddings and the other for reading the reverse sequence of the same embeddings. When individual word embeddings are input to this bidirectional GRU architecture, two separate sequence vectors are generated that are concatenated and used in the category-specific CRF. As further depicted in the example of FIG. 3, concatenated sequence vectors along with the positional indices are input to the CRF which classifies each input token as a value for the corresponding attribute key.

The final workflow illustrated in the pipeline of FIG. 1 comprises the Category-Specific Attribute Recognition. Attributes of a requested item (via the natural language query) depend heavily on the broader product type in question. Hence, a category-specific approach is employed to identify the attributes. This is effectively an ensemble of attribute identifier models, one for each product category. Information regarding specific attributes is extracted from the query via a category-specific Conditional Random Fields (CRF) model. The attribute recognizer takes the natural language query and its predicted category name as input and tags each word in the query to one of the attributes of the category.

FIG. 4 illustrates a parsing of the natural language query "LED lamp 15 W power 120V voltage" that identifies key-characteristics and corresponding values, as well as the predicted product category of "LED Bulbs." More particularly, the top row shows the words of the natural language query and the bottom row highlights the system-predicted product category (LED Bulbs) and key-characteristics corresponding to the query-words, where existing (Wattage, Voltage Rating), but those words of the query having no corresponding key-characteristic are designated with the moniker of NA for none available. It should be appreciated that a separate CRF model is trained for each product category. The CRF accepts the bidirectional GRU hidden state vectors as inputs and is trained on a Stochastic Gradient Descent (SGD). During the training, negative log-likelihood loss (NLL) is minimized.

During the inference time, the CRF ensemble receives two inputs. The first is the predicted product category and the second is the bidirectional GRU output vectors as described above. The predicted category is used to select the appropriate model from the ensemble to perform the attribute identification sequentially. The final output is relayed to a downstream search engine where information retrieval and ranking are handled.

As describe at least in part above, the presently disclosed category classification and attribute identification system comprises, among others, the following distinctive features compared to state-of-the-art techniques. It provides improved search relevance through custom-training of the word embedding model based on electrical hardware vocabulary. This allows for a deeper contextual understanding of the item descriptions employed in the search. Effective estimation of query embedding vectors is enabled through the simple aggregation of word embeddings. Although it is a simple averaging, it is effective in creating a good representation of the query as an input to the category classifier. Improved training and inference efficiency is provided through the use of Gated Recurrent Units (GRU) versus Long Short Term Memory (LSTM) units without compromising accuracy. Bidirectional sequence embeddings coupled with category-specific CRF models is utilized for novel per-category attribute key-value pair identification. In another aspect, category-specific attribute identification through an ensemble of Conditional Random Field (CRF) models are trained individually for a specific product category. Because of the usage of category-specific CRF models, attribute identification becomes a more simple problem to solve, and overall accuracy is improved.

The described method improves the user experience by allowing the search engine downstream to perform a more focused search based on an improved understanding of the user's intended attributes in the item being searched. This enhanced accuracy is due at least in part to custom-training the word embedding model based on electrical hardware vocabulary that allows the machine learning pipeline to utilize a highly contextualized representation of text. Another improvement comes from the system's category-specific attribute identification results in improved attribute identification accuracy by using an ensemble of CRF models, each trained individually for a specific product category. Further benefit is derived from the system's effective estimation of the query embedding vector through simple aggregation of word embeddings.

The disclosed technology also improves the user experience by performing the search much faster in dependence on the simplified architecture of the sequence encoder (using GRU instead of LSTM) which is faster to train and therefore reduces time-to-market for new models and is faster to infer, which improves the search experience. Still further, the use of category-specific CRFs facilitates quicker attribute identification, as only the products within the classified category are searched, reducing the search space down to a little as five percent of the total database.

In at least one embodiment, the presently disclosed technology takes the form of a computer-implemented method for identifying product in a distributor's inventory system that fulfills a product request made via a natural language query. Typically, the query is typed into the computing system by the user, but it may also be otherwise obtained. For instance, a list of desired products can be uploaded into the system, via an Excel spreadsheet, for example. In an initial step, the system receives (obtains) the natural language query as a product request and which comprises (includes, but is not necessarily limited to) a plurality (two or more) of words in a sequential order. Next, each of the words is vectorized, thereby generating a plurality of corresponding word-vectors. Those word-vectors are then concatenated, and that concatenation is used to generate a query embedding.

The query embedding is processed utilizing a trained product category classifier machine learning model (ML model), thereby predicting in which of a plurality of predefined product categories the requested product belongs. In at least one embodiment, the categories are designated by the distributor and the ML model is generated using supervised training on category-associated terms.

Next, a forward sequence vector and a backward sequence vector are generated based on the sequentially ordered words of the natural language query. The forward and backward sequence vectors are concatenated and that concatenation is processed using a trained ML model specific to the predicted product category and thereby identifying one or more product attributes embodied in the natural language query that each correspond to a predetermined key-characteristic of the category. The sequence vectors represent positional relationships between the words of the natural language query.

In another aspect, the method includes assigning at least one of the identified key-characteristics of the predicted product category a value derived from the natural language query.

In the present disclosure, the distributor's inventory system is focused on the domain of electrical hardware products.

Exemplarily, the method comprises predicting that the product category to which the requested product belongs is "lighting" based on processing the query embedding using the category classifier ML model. Such a category can be further parsed, or otherwise referred to, for example, as "LED Lighting" or "LED Bulbs."

In this example, a product attribute of the requested product is identified as wattage, which is a key-characteristic associated with the lighting product category.

Furthermore, a value of the product attribute, wattage, is identified as 15 W based on the processing of the concatenation of the forward and backward sequence vectors.

In a similar manner, "voltage" is identified as a product attribute of the requested product, where voltage, as a key-characteristic, is also associated with the lighting product category. Exemplarily, a value of the product attribute, voltage, is identified as 120V, also based on processing the concatenation of the forward and backward sequence vectors.

In a more generic sense, the method can identify a product matching the requested product from among a plurality of products allocated to the identified product category in dependence upon the identified value of the key-characteristic embodied in the natural language query.

The trained ML model that generates the query embedding from the vectorized words of the natural language query exemplarily comprises a Continuous-Bag-Of-Words algorithm trained on a plurality of words derived from product descriptions.

In as specific example, the trained ML model that generates the query embedding from the vectorized words of the natural language query comprises a Continuous-Bag-Of-Words algorithm trained on over 100,000 (or 50,000 or 10,000) unique words derived from distributor product catalog data.

In another example, the trained product category classifier ML model processes the query embedding utilizing a 3-layer feed-forward Multi-Layer Perceptron (MLP) architecture to predict product category.

Still further, the method includes processing the plurality of word-vectors that generate the query embedding using a query embedder that utilizes a machine-learning model and the query embedder comprises an aggregator, and wherein the aggregator is configured to concatenate vectors representing each of the two or more words to generate the query embedding.

General Description of AI/ML and Exemplary System Configuration(s)

The disclosure set forth below provides general description of various configurations of the subject technology and is not intended to represent the only configurations in which the subject technology can be practiced. The appended drawings are incorporated herein and constitute a part of this specification. This description includes details for the purpose of providing a more thorough understanding of the subject technology. However, the subject technology is not limited to the specific details set forth therein and may be practiced with or without these details. In some instances, structures and components are shown in block diagram form so as to avoid obscuring the concepts of the subject technology.

Figure 5:
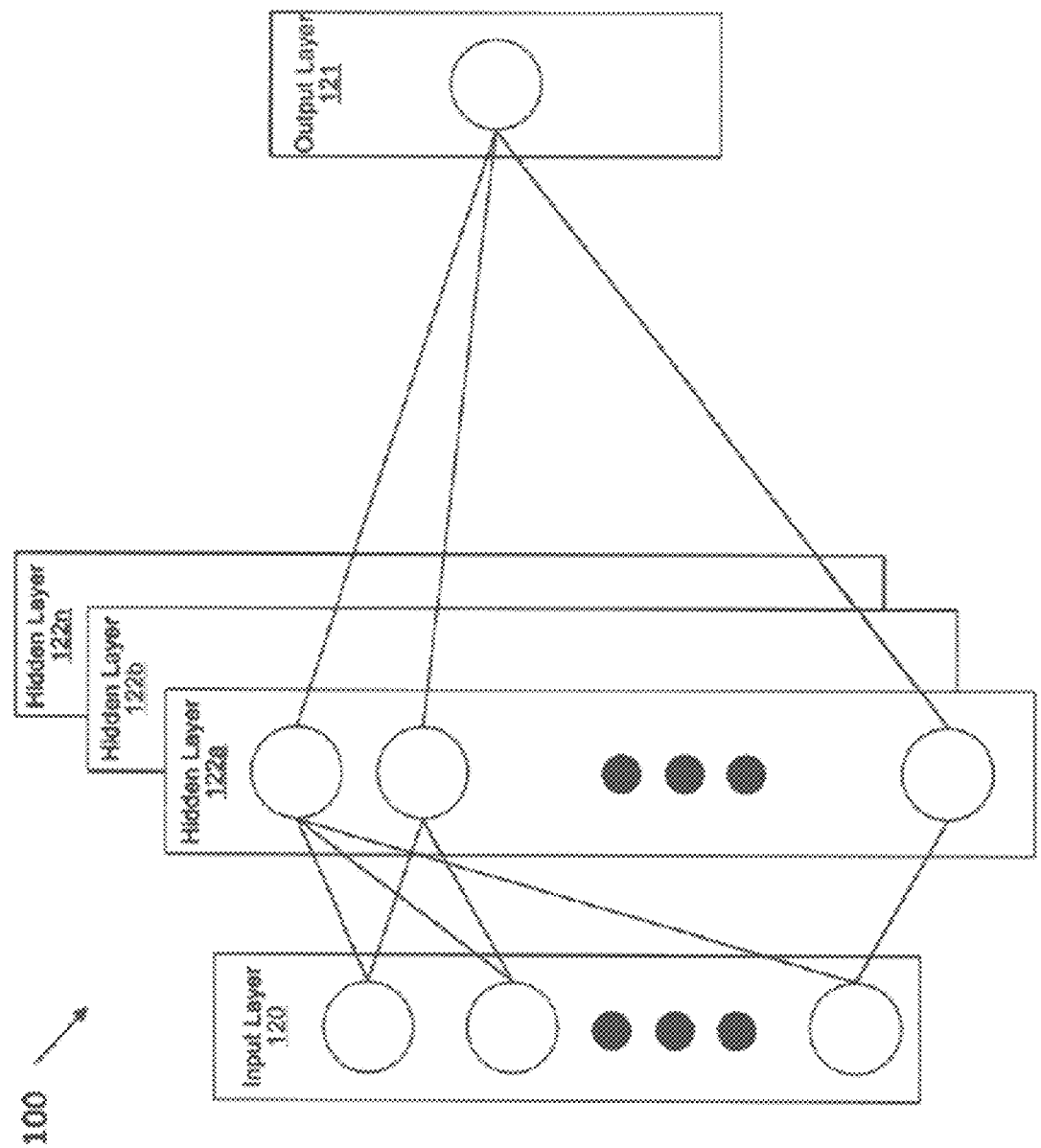
FIG. 5 is a schematic of an exemplary deep learning neural network useable for presently disclosed AI/ML model training, model generation and natural language query data processing and using the generated models for identifying requested product.

The disclosure now turns to additional discussion of models that can be used in the environments and techniques described herein. Specifically, FIG. 5 is an illustrative example of a deep learning neural network 100. These networks are referred to as "neural" networks because they reflect the behavior of the human brain. These neural networks, also referred to as artificial neural networks (ANNs) and/or simulated neural networks (SNNs), are subsets of machine learning (ML). The network has an input layer 120 that is configured to receive input data, which in the present case is data derived from the natural language query. The neural network 100 includes multiple hidden layers 122a, 122b, through 122n. The hidden layers 122a, 122b, through 122n include "n" number of hidden layers, where "n" is an integer greater than or equal to one. The number of hidden layers can be made to include as many layers as needed for the given application. The neural network 100 further includes an output layer 121 that provides an output resulting from the processing performed by the hidden layers 122a, 122b, through 122n. It is the presence of the multiple hidden layers that gives rise to the "deep learning" description.

The neural network 100 is a multi-layer neural network of interconnected nodes. Each node can represent a piece of information. Information associated with the nodes is shared among the different layers and each layer retains information as information is processed. In some cases, the neural network 100 can include a feed-forward network, in which case there are no feedback connections where outputs of the network are fed back into itself. In some cases, the neural network 100 can include a recurrent neural network, which can have loops that allow information to be carried across nodes while reading in input.

Information can be exchanged between nodes through node-to-node interconnections between the various layers. Nodes of the input layer 120 can activate a set of nodes in the first hidden layer 122a. For example, as shown, each of the input nodes of the input layer 120 is connected to each of the nodes of the first hidden layer 122a. The nodes of the first hidden layer 122a can transform the information of each input node by applying activation functions to the input node information. The information derived from the transformation can then be passed to and can activate the nodes of the next hidden layer 122b, which can perform their own designated functions. Example functions include convolutional, up-sampling, data transformation, and/or any other suitable functions. The output of the hidden layer 122b can then activate nodes of the next hidden layer, and so on. The output of the last hidden layer 122n can activate one or more nodes of the output layer 121, at which an output is provided. In some cases, while nodes in the neural network 100 are shown as having multiple output lines, a node can have a single output and all lines shown as being output from a node represent the same output value.

In some cases, each node or interconnection between nodes can have a weight that is a set of parameters derived from the training of the neural network 100. Once the neural network 100 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 100 to be adaptive to inputs and able to learn as more and more data is processed.

The neural network 100 can be pre-trained to process the features from the data in the input layer 120 using the different hidden layers 122a, 122b, through 122n in order to provide the output through the output layer 121.

In some cases, the neural network 100 can adjust the weights of the nodes using a training process called backpropagation. As noted above, a backpropagation process can include a forward pass, a loss function, a backward pass, and a weight update. The forward pass, loss function, backward pass, and parameter update is performed for one training iteration. The process can be repeated for a certain number of iterations for each set of training data until the neural network 100 is trained well enough so that the weights of the layers are accurately tuned.

In general, and as noted above, for a first training iteration for the neural network 100, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 100 is unable to determine low level features and thus cannot make an accurate determination of what the classification of the object might be. A loss function can be used to analyze error in the output. Any suitable loss function definition can be used, such as a Cross-Entropy loss. Another example of a loss function includes the mean squared error (MSE), defined as E_total=$\Sigma(1/2$ (target-output)^2). The loss can be set to be equal to the value of E_total.

Generally, a goal of training is to minimize the amount of loss so that the predicted output is the same as the training label. The neural network 100 can perform a backward pass by determining which inputs (weights) most contributed to the loss of the network, and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as w=w_i−ηdL/dW, where w denotes a weight, w_i denotes the initial weight, and η denotes a learning rate. The learning rate can be set to any suitable value, with a high learning rate including larger weight updates and a lower value indicating smaller weight updates.

The neural network 100 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The neural network 100 can include any other deep network other than a CNN, such as an autoencoder, a deep belief nets (DBNs), a Recurrent Neural Networks (RNNs), among others.

As understood by those persons skilled in these arts, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; generative adversarial networks (GANs); support vector machines; image registration methods; applicable rule-based system. Where regression algorithms are used, they may include but are not limited to: a Stochastic Gradient Descent Regressor, and/or a Passive Aggressive Regressor, and the like.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm and the like.

Figure 6:
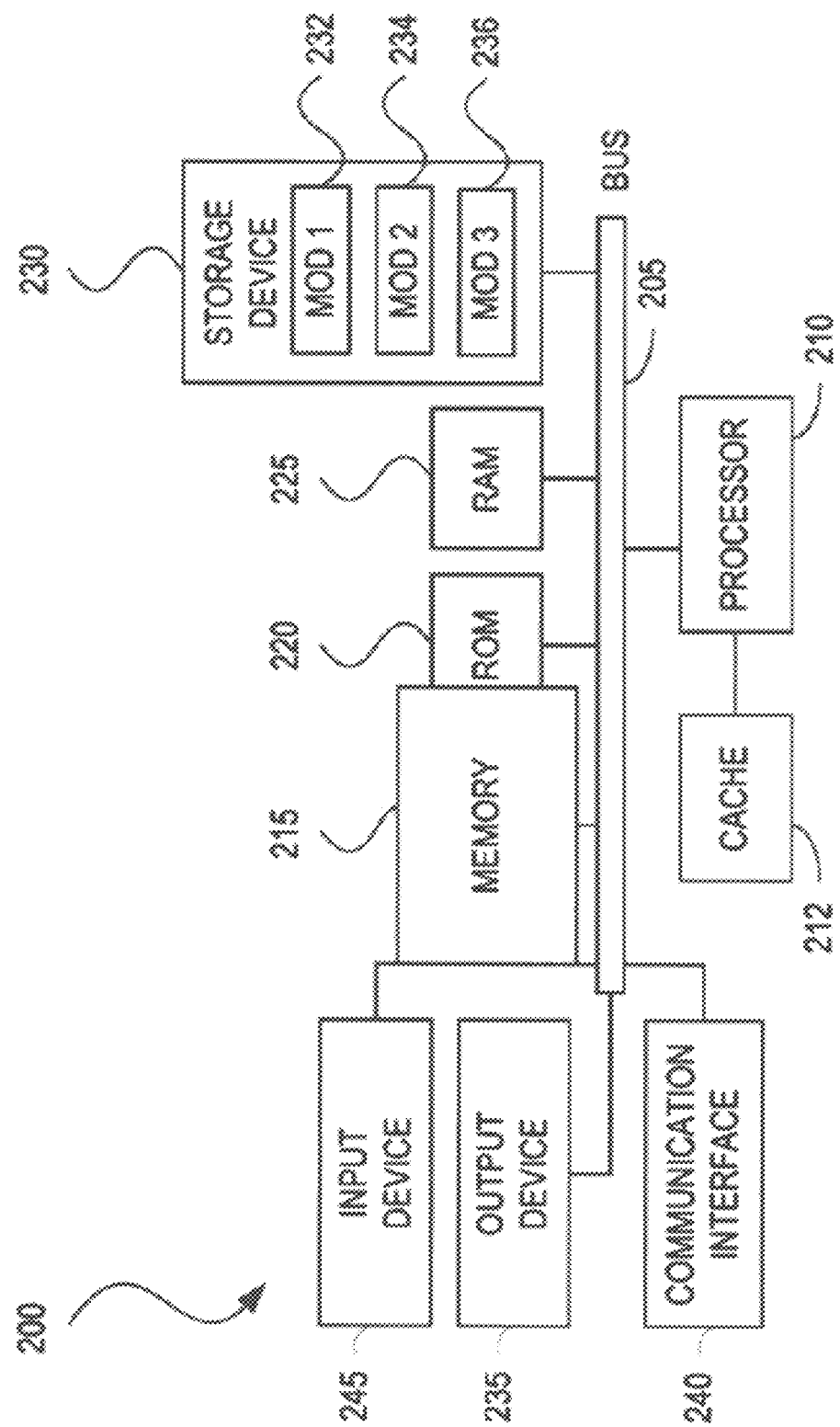
FIG. 6 depicts an exemplary processor-based computing system suitable for use as a platform for executing certain routines of the presently disclosed requested product identification.

The disclosure now turns to FIG. 6 which illustrates an example of a processor-based computing system 200 wherein the components of the system are in communication with each other using a system bus 205. The computing system 200 can include a processing unit (CPU or processor) 210 and a system bus 205 that may couple various system components including the system memory 215, such as read only memory (ROM) 220 and random-access memory (RAM) 225, to the processor 210. The computing system 200 can include a cache 212 of high-speed memory connected directly with, in close proximity to, or integrated as part of the processor 210.

The computing system 200 can copy data from the memory 215, ROM 220, RAM 225, and/or storage device 230 to the cache 212 for quick access by the processor 210. In this way, the cache 212 can provide a performance boost that avoids processor delays while waiting for data. These and other modules can control the processor 210 to perform various actions. Other system memory 215 may be available for use as well. The memory 215 can include multiple different types of memory with different performance characteristics. The processor 210 can include any general-purpose processor and a hardware module or software module, such as module 1 232, module 2 234, and module 3 236 stored in the storage device 230, configured to control the processor 210 as well as a special-purpose processor where software instructions are incorporated into the actual processor design. The processor 210 may essentially be a completely self-contained computing system, containing multiple cores or processors, a system bus, memory controller, cache, etc. A multi-core processor may be symmetric or asymmetric.

To enable user interaction with the computing system 200, an input device 245 can represent any number of input mechanisms, such as a microphone for speech, a touch-protected screen for gesture or graphical input, keyboard, mouse, motion input, speech and so forth. An output device 235 can also be one or more of a number of output mechanisms known to those of skill in the art. In some instances, multimodal systems can enable a user to provide multiple types of input to communicate with the computing system 200. The communications interface 240 can govern and manage the user input and system output. There may be no restriction on operating on any particular hardware arrangement and therefore the basic features here may easily be substituted for improved hardware or firmware arrangements as they are developed.

The storage device 230 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 230 can include the software modules 232, 234, 236 for controlling the processor 210. Other hardware or software modules are contemplated. The storage device 230 can be connected to the system bus 205. In some embodiments, a hardware module that performs a particular function can include a software component stored in a computer-readable medium in connection with the necessary hardware components, such as the processor 210, system bus 205, output device 235, and so forth, to carry out the function. For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general-purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method for identifying product in a distributor inventory system that fulfills a product request made via a natural language query, said method comprising:
receiving a natural language query as a product request, said natural language query comprising a plurality of words in a sequential order;
vectorizing each of the words and thereby generating a plurality of corresponding word-vectors through a word embedding model that is trained on product-specific vocabulary;
aggregating the plurality of word-vectors to form a query embedding by concatenating the plurality of word-vectors;
processing the query embedding utilizing a trained product category classifier ML model and thereby predicting in which of a plurality of predefined product categories the requested product belongs;
generating, based on the plurality of sequential order words of the natural language query, a forward sequence vector and a backward sequence vector;
selecting a trained ML model specific to the predicted product category from a plurality of product category-specific trained models that are trained for different product categories; and
concatenating the forward and backward sequence vectors and processing that concatenation using the trained ML model specific to the predicted product category and thereby identifying one or more product attributes embodied in the natural language query that each correspond to a predetermined key-characteristic of the category;
generating an output comprising an indication of the one or more product attributes and an indication of the predicted product category and providing the output to a search engine.

2. The computer-implemented method of claim 1, further comprising assigning at least one of the identified key-characteristics of the predicted product category a value derived from the natural language query.

3. The computer-implemented method of claim 1, wherein the domain of the distributor inventory system is electrical hardware products.

4. The computer-implemented method of claim 3, further comprising predicting that the requested product belongs to a product category for lighting based on processing the query embedding using the category classifier ML model.

5. The computer-implemented method of claim 4, further comprising identifying a product attribute of the requested product to be wattage; and
wherein, wattage, as a key-characteristic is associated with the lighting product category.

6. The computer-implemented method of claim 5, further comprising identifying a value of the product attribute, wattage, to be 15 W based on processing the concatenation of the forward and backward sequence vectors.

7. The computer-implemented method of claim 4, further comprising identifying a product attribute of the requested product to be voltage; and
wherein, voltage, as a key-characteristic is associated with the lighting product category.

8. The computer-implemented method of claim 7, further comprising identifying a value of the product attribute, voltage, to be 120 V based on processing the concatenation of the forward and backward sequence vectors.

9. The computer-implemented method of claim 2, further comprising identifying a product match to the requested product from among a plurality of products allocated to the identified product category in dependence upon the identified value of the key-characteristic embodied in the natural language query.

10. The computer-implemented method of claim 1, wherein the trained model that generates the query embedding from the vectorized words of the natural language query comprises a Continuous-Bag-Of-Words algorithm trained on a plurality of words derived from product descriptions.

11. The computer-implemented method of claim 1, wherein the trained model that generates the query embedding from the vectorized words of the natural language query comprises a Continuous-Bag-Of-Words algorithm trained on over 100,000 unique words derived from distributor product catalog data.

12. The computer-implemented method of claim 1, wherein the trained product category classifier model processes the query embedding utilizing a 3-layer feed-forward Multi-Layer Perceptron (MLP) architecture to predict product category.

13. The computer-implemented method of claim 1, further comprising processing the plurality of word-vectors that generate the query embedding using a query embedder that utilizes a machine-learning model.

14. The computer-implemented method of claim 13, wherein the query embedder comprises an aggregator, and wherein the aggregator is configured to concatenate vectors representing each of the two or more words to generate the query embedding.

15. The computer-implemented method of claim 1, wherein the sequence vectors represent positional relationships between the words of the natural language query.

16. An apparatus for identifying a product, comprising:
at least one memory; and
at least one processor coupled to the at least one memory, the at least one processor configured to:
receive a natural language query as a product request, said natural language query comprising a plurality of words in a sequential order;
vectorize each of the words and thereby generating a plurality of corresponding word-vectors through a word embedding model that is trained on product-specific vocabulary;
aggregate the plurality of word-vectors to form a query embedding by concatenateing the plurality of word-vectors;
process the query embedding utilizing a trained product category classifier ML model and thereby predicting in which of a plurality of predefined product categories the requested product belongs;
generate, based on the plurality of sequential order words of the natural language query, a forward sequence vector and a backward sequence vector;
select a trained ML model specific to the predicted product category from a plurality of product category-specific trained models that are trained for different product categories;
concatenate the forward and backward sequence vectors and processing that concatenation using the trained ML model specific to the predicted product category and thereby identifying one or more product attributes embodied in the natural language query that each correspond to a predetermined key-characteristic of the category; and
generate an output comprising an indication of the one or more product attributes and an indication of the predicted product category and providing the output to a search engine.

17. A non-transitory computer-readable storage medium comprising at least one instruction for causing a computer or processor to:
receive a natural language query as a product request, said natural language query comprising a plurality of words in a sequential order;
vectorize each of the words and thereby generating a plurality of corresponding word-vectors through a word embedding model that is trained on product-specific vocabulary;
aggregate the plurality of word-vectors to form a query embedding by concatenateing the plurality of word-vectors;
process the query embedding utilizing a trained product category classifier ML model and thereby predicting in which of a plurality of predefined product categories the requested product belongs;
generate, based on the plurality of sequential order words of the natural language query, a forward sequence vector and a backward sequence vector;
select a trained ML model specific to the predicted product category from a plurality of product category-specific trained models that are trained for different product categories;
concatenate the forward and backward sequence vectors and processing that concatenation using the trained ML model specific to the predicted product category and thereby identifying one or more product attributes embodied in the natural language query that each correspond to a predetermined key-characteristic of the category; and
generate an output comprising an indication of the one or more product attributes and an indication of the predicted product category and providing the output to a search engine.

* * * * *